J. R. FITSHOUS.
ADJUSTABLE LOCKS AND DOGS FOR HAY-ELEVATORS.
No. 170,945.  Patented Dec. 14, 1875.
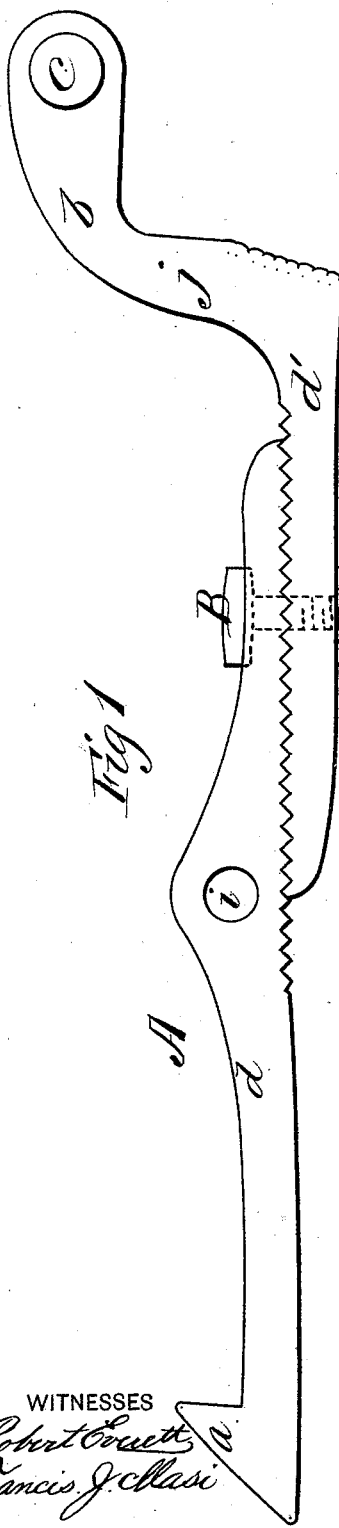
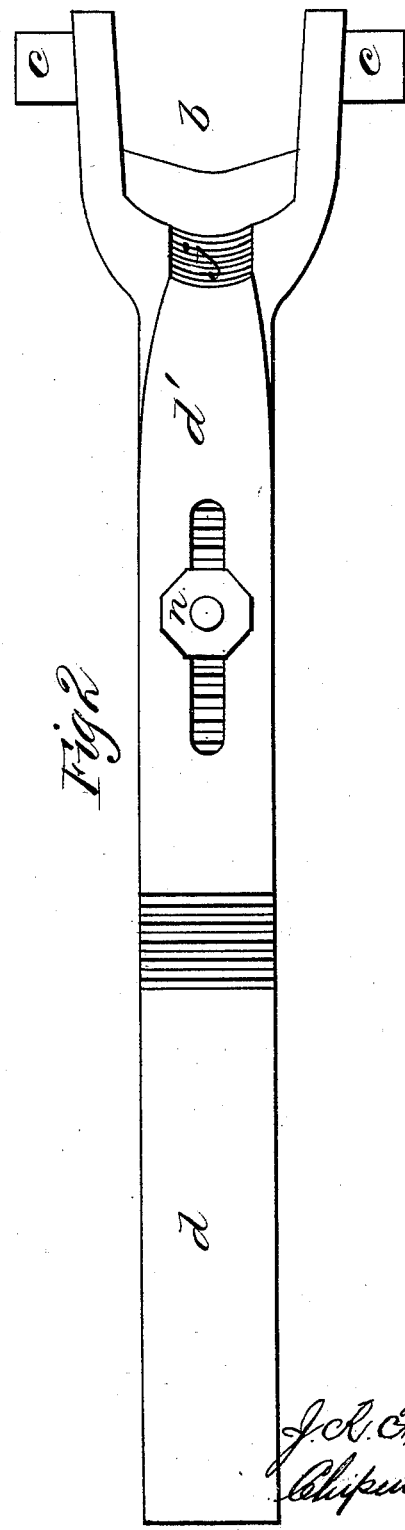
WITNESSES
Robert Everett
Francis J. Masi
INVENTOR
J. R. Fitshous
Chipman & Somer
ATTORNEYS

UNITED STATES PATENT OFFICE.

JACOB R. FITSHOUS, OF CENTRE HALL, PENNSYLVANIA.

IMPROVEMENT IN ADJUSTABLE LOCKS AND DOGS FOR HAY-ELEVATORS.

Specification forming part of Letters Patent No. 170,945, dated December 14, 1875; application filed May 8, 1875.

*To all whom it may concern:*

Be it known that I, JACOB R. FITSHOUS, of Centre Hall, in the county of Centre and State of Pennsylvania, have invented a new and valuable Improvement in Adjustable Lock and Dogs; and I do hereby declare that the following is a full, clear, and exact description of the construction and operation of the same, reference being had to the annexed drawings, making a part of this specification, and to the letters and figures of reference marked thereon.

Figure 1 of the drawings is a representation of a side view of my device, and Fig. 2 is a plan view of the same.

This invention has relation to improvements in hay-elevators for which Letters Patent of the United States were granted to me, bearing date of September 1, 1874, and numbered 154,598, wherein was shown and described a vertically-vibrating catching-lever (designated by the letter D in the drawings) of angular form, one end of which was provided with a hook, and the other with serrations, which seized upon the elevating-rope and held the load on the fork at the elevation obtained, when the said rope ceased to be actuated, so that the carriage might be run from the wagon containing the hay to a mow, in which it is designed to be deposited, without danger of the hay on the fork being allowed to fall to the ground during such movement.

The object of the invention in this class of devices is mainly to provide a means whereby the same dog may be used with various sizes of rope, which it has been found advantageous to use in elevating a greater or a less weight of hay, so that the serrated end of the said dog may not unduly gripe the rope, and thus cause it to be prematurely worn out.

To this end the nature of the invention consists in a sectional lever, the contiguous surfaces of which are correspondingly serrated, which sections are adapted to be adjustably clamped together, whereby the length of the said latching-lever may be decreased for the purpose of using a larger rope, or increased when a small rope is deemed sufficient, as will be hereinafter more fully explained.

In the annexed drawings, A designates an angular latching dog or lever, having upon one end a hook, $a$, and upon its other end a bifurcation, $b$, which is provided with trunnions $c$, whereby a detaching-stirrup is suspended. This lever or catch is composed of two sections, $d\ d'$, which overlap each other, their contiguous edges being correspondingly serrated, so that when they are laid upon each other the elevations of the one shall fit snugly in the depressions of the other. These sections are clamped together by means of a headed bolt, B, which passes through a perforation in one section, into and through a longitudinal slot in the other section, and a nut, $n$, applied upon its screw-threaded projecting end.

When this nut is forcibly set up, by means of a suitable wrench, the two sections will be clamped together, and their contiguous overlapping edges being correspondingly serrated all endwise displacement of the said sections relative to each other will be effectually prevented. Latching-dog A is pivoted by means of an opening, $i$, to the carriage, and its short arm $j$, which is concave and transversely serrated, overhangs an elevating-rope passing over a pulley suspended from the carriage, so that, while the rope passes freely under the serrated surface of the said lever during the elevation of a loaded fork, it will be clamped against the periphery of the elevating-pulley by the serrated arm $j$ of the dog, thus holding the load at the point at which it had been raised.

In order that the size of the rope may be increased or diminished, as the necessities of the case may require, the dog is made sectional and adjustable, the adjustment for a larger rope being obtained by thrusting the sections inward upon each other, and then clamping them together, as above described, thus shortening the dog and increasing the distance between the serrated arm $j$ and the periphery of the elevating-pulley, and for a smaller rope by an opposite movement.

It will be observed that the dog is peculiarly constructed with reference to the serrations between the jaws and the plane they occupy with the pivot-pin. This peculiar construction is designed to be shown and claimed in a separate application I am about to make.

What I claim as new, and desire to secure by Letters Patent, is—

The dog for hay-elevators, as described, having sections $d$ and $d'$ serrated and adjustably united by a set-screw, B, and also having a hook, $a$, on one section, while the other is bifurcated and serrated, substantially as specified.

In testimony that I claim the above I have hereunto subscribed my name in the presence of two witnesses.

JACOB R. FITSHOUS.

Witnesses:
PETER HARROLD,
ROBERT RALSTON.